United States Patent
Heiberger et al.

(10) Patent No.: US 9,500,109 B2
(45) Date of Patent: Nov. 22, 2016

(54) WATER-INJECTION EMISSIONS CONTROL FOR A GAS TURBINE

(71) Applicant: Wellhead Electric Company, Inc., Sacramento, CA (US)

(72) Inventors: Christian Skov Heiberger, Fresno, CA (US); John Grant McDaniel, Sacramento, CA (US)

(73) Assignee: Wellhead Electric Company, Inc., Sacremento, CA (US)

( * ) Notice: Subject to any disclaimer, the term of this patent is extended or adjusted under 35 U.S.C. 154(b) by 0 days.

(21) Appl. No.: 14/718,056

(22) Filed: May 20, 2015

(65) Prior Publication Data

US 2015/0337704 A1 Nov. 26, 2015

Related U.S. Application Data

(60) Provisional application No. 62/000,806, filed on May 20, 2014.

(51) Int. Cl.

| | |
|---|---|
| *F02C 3/30* | (2006.01) |
| *F01N 3/04* | (2006.01) |
| *F01N 3/20* | (2006.01) |
| *F01N 3/08* | (2006.01) |
| *F01D 25/30* | (2006.01) |
| *F02C 7/141* | (2006.01) |
| *F02C 7/143* | (2006.01) |
| *F02C 9/28* | (2006.01) |

(52) U.S. Cl.
CPC ............. *F01N 3/04* (2013.01); *F01D 25/305* (2013.01); *F01N 3/0842* (2013.01); *F01N 3/208* (2013.01); *F02C 7/141* (2013.01); *F02C 7/1435* (2013.01); *F02C 9/28* (2013.01); *F01N 2570/14* (2013.01); *F05D 2270/082* (2013.01)

(58) Field of Classification Search
CPC ........ F02C 3/30; F02C 7/1435; F02C 3/305; F02C 7/141; F02C 9/28; F05D 2270/082; B01D 53/8625
See application file for complete search history.

(56) References Cited

U.S. PATENT DOCUMENTS

| | | | |
|---|---|---|---|
| 2005/0034463 A1* | 2/2005 | Simpson | F02C 3/30 60/775 |
| 2015/0020529 A1* | 1/2015 | Hoskin | F02C 3/30 60/772 |
| 2015/0020530 A1* | 1/2015 | Pandey | F01N 3/208 60/772 |

* cited by examiner

*Primary Examiner* — Jonathan Matthias
(74) *Attorney, Agent, or Firm* — Schwegman Lundberg & Woessner, P.A.

(57) ABSTRACT

A system and method include a nozzle configured to inject water into a gas turbine at a specified water flow rate. An effluent stream of the gas turbine includes a gas turbine effluent stream including a first emission level. A secondary emissions control apparatus is in fluid communication with the gas turbine effluent stream. An output stream of the secondary emissions control apparatus can include a second emissions level below a specified emissions output threshold. The method and system can reduce the amount of water over time that is introduced into the gas turbine based on the threshold emissions reduction capability of the secondary emissions control apparatus.

20 Claims, 2 Drawing Sheets

WATER-INJECTION EMISSIONS CONTROL FOR A GAS TURBINE

CROSS REFERENCE TO RELATED APPLICATIONS

The present application claims priority to U.S. Provisional Patent Application Ser. No. 62/000,806 filed May 20, 2014, entitled "WATER-INJECTION EMISSIONS CONTROL SYSTEM AND METHOD," which is hereby incorporated by reference in its entirety.

TECHNICAL FIELD

This present disclosure relates generally to energy facilities and, in particular, to methods of controlling water-injection emissions for a gas turbine.

BACKGROUND

In the operation of gas turbines, nitrogen oxides (NOx) are often produced in the exhaust gas, with NOx including nitrogen monoxide (NO) and nitrogen dioxide ($NO_2$). With regulations of NOx emissions becoming more stringent throughout the world, minimizing such emissions is an important design criterion.

Therefore, emissions reduction (e.g., NOx reduction) in energy production can be an important process for complying with local and federal regulations. In various examples, emissions reduction is performed mid-process stream or post-process stream. For example, energy facilities utilize various processes for the control of nitrogen oxides (NOx) produced during combustion of hydrocarbons, such as in a gas turbine.

SUMMARY

To reduce the NOx emissions, previous approaches have included the use of a selective catalyst reduction ("SCR") system. Such a SCR system can be connected to the gas turbine effluent. The SCR system adds a reductant, typically ammonia or urea, to the exhaust gas stream before passing the stream through a catalytic bed so as to absorb selectively the nitrogen oxides and the reducing agent. The absorbed components undergo a chemical reaction on the catalyst surface and the reaction products are desorbed. Specifically, the reductant reacts with the nitrogen oxides in the flow of the exhaust to form water and nitrogen. Catalysts that use other types of reductants are also known in the art.

Other previous approaches have used higher water injection rates to maintain low NOx levels (as measured in parts per million, volumetric dry (ppmvd) at part load, which results in lower service life of gas turbine components, primarily due to erosion.

The present inventors have recognized, among other things, that a problem to be solved can include reducing the water to fuel ratios used in NOx control systems and methods. Increased levels of water to fuel ratios can have a negative impact on internal components of a gas turbine. For example, the presence of water in the gas turbine causes corrosion, which reduces the service life of components of the gas turbine. In an example, the present subject matter can provide a solution to this problem, such as by optimizing a dual emissions control process including water-injection and a secondary emissions control process downstream of the gas turbine. Water to fuel injection ratios are established based on a maximum NOx input capability of the secondary emissions control process. That is, water to fuel injection ratios are minimized such that the output of the dual emissions control process meets a targeted emissions level, such as established by local or federal regulations. The allowable emissions level of the gas turbine effluent is increased because the effluent undergoes a secondary emissions reduction process. As such, the amount of water injected into the gas turbine can be reduced.

The present disclosure provides a secondary apparatus for reducing NOx downstream of the gas turbine, such that the water injection rate can be reduced, particularly at part load. This is accomplished by only injecting enough water to reduce the NOx loading (at the gas turbine effluent outlet in pounds per hour (lb/hr)) to the normal maximum operating point that the secondary NOx reduction apparatus is designed to handle.

The present inventors have recognized, among other things, that a problem to be solved can include reducing the occurrences of mechanical or operating failures of a gas turbine facility. Mechanical failures result from a number of factors, including, but not limited to, corrosion and material fatigue. Operating failures result from processes which exceed operating specifications, such as emissions output. In an example, the present subject matter can provide a solution to this problem, such as by providing a dual emissions control process. The water to fuel ratio can be minimized to reduce mechanical failures resulting from the presence of water in the system. Further, the dual emissions control system and method can provide a two stage process for control emissions to meet or exceed operating specifications. In an example the secondary emissions control can include a selective catalyst reduction (SCR), selective non-catalyst reduction.

To better illustrate the encapsulated method and systems disclosed herein, a non-limiting list of examples is provided here:

Example 1 can include subject matter (such as a method) for operating a gas turbine comprising a nozzle configured to inject water into a gas turbine at a first specified water flow rate, a gas turbine having an inlet water stream, an inlet fuel stream, and a gas turbine effluent stream, the gas turbine effluent stream including emissions at a first emission level; a secondary emissions control apparatus positioned downstream from the gas turbine, the second emission control apparatus having an secondary inlet stream including the gas turbine effluent stream and a secondary outlet stream, the secondary outlet stream having a second emissions level; and an emissions control unit, configured to: monitor, or calculate by modeled values, the first emission level of the gas turbine effluent stream; determine, if the first emission level is greater than a predetermined emissions level; and increase, in response to the first emission level being greater than the predetermined emissions level, the first specified water flow rate to a second specified water flow rate.

In Example 2, the subject matter of Example 1 can optionally include where the predetermined emissions level is equal to or less than a maximum emissions threshold capability of the secondary emissions control apparatus.

In Example 3, the subject matter of Example 1 can optionally include where further including, while the water is being injected into the gas turbine at the second specified water flow rate, the emission control unit is configured to: determine, if the first emission level is less than the predetermined emissions level; and decrease, in response to the first emissions level being less than the predetermine demission level, the second specified water flow rate to a third water flow rate.

In Example 4, the subject matter of Example 1 can optionally include where the specified water rate is based on the predetermined emissions level.

In Example 5, the subject matter of Example 1 can optionally include where the specified water rate corresponds to a water to fuel ratio In Example 6, the subject matter of Example 1 can optionally include where the gas turbine is operating below a maximum load capability of the gas turbine.

In Example 7, the subject matter of Example 1 can optionally where the secondary emissions control apparatus is a selective catalyst reduction apparatus.

In Example 8, the subject matter of Example 1 can optionally include where the secondary emissions control apparatus is a selective non-catalytic reduction apparatus Example 9 can include subject matter (such as a method) for controlling gas turbine emissions, comprising injecting water and a fuel into a gas turbine at a specified water flow rate, combusting at least the fuel in the gas turbine to provide a combustion product having a predetermined emissions level, providing the combustion product by an effluent stream to a secondary emissions control apparatus, determining when the combustion product includes a first emissions level that is greater than the predetermined emissions level, and in response to determining the combustion product includes the first emissions level that is greater than the predetermined emission level, increasing the specified water flow rate such until the first emissions level is equal to or less than the predetermined emission level.

Example 10, the subject matter of claim 9 can optionally include where the predetermined emissions level is equal to or less than a maximum emissions threshold capability of the secondary emissions control apparatus.

In Example 11, the subject matter of Example 9 can optionally include determining the specified water rate based on the predetermined emissions level.

In Example 12, the subject matter of Example 9 can optionally include determining the predetermined emission level based on a maximum emissions threshold capability of the secondary emissions control apparatus.

In Example 13, the subject matter of Example 9 can optionally include operating the gas turbine below a maximum load capability of the gas turbine.

In Example 14, the subject matter of Example 9 can optionally include where secondary emissions control apparatus is a selective catalyst reduction apparatus.

In Example 15, the subject matter of Example 9 can optionally include where the secondary emissions control apparatus is a selective non-catalytic reduction apparatus.

In Example 16, the subject matter of Example 9 can optionally include where the secondary emissions control apparatus includes a secondary effluent stream including a second emissions level, and wherein, when the first emissions level is at the predetermined emissions level, the second emissions level is substantially equal to a maximum emissions threshold capability.

Example 17 can include subject matter (such as a system) for emissions control of a gas turbine comprising a nozzle configured to inject water into a gas turbine, a gas turbine having an inlet water stream, an inlet fuel stream, and a gas turbine effluent stream, the gas turbine effluent stream including emissions at a first emission level, a secondary emissions control apparatus positioned downstream from the gas turbine, the second emission control apparatus having an secondary inlet stream including the gas turbine effluent stream and a secondary outlet stream, the secondary outlet stream having a second emissions level, a water flow rate adjuster, a first emissions sensor coupled to the gas turbine effluent stream, an emissions control unit configured to: determine the first emission level of the gas turbine effluent stream, determine, if the first emission level is greater than a predetermined emissions level, the predetermined emissions level is within a predetermined range from a maximum emissions threshold capability of the secondary emission control apparatus, and increase, in response to the first emission level being greater than the predetermined emissions level, a flow rate of water introduced into the gas turbine via the nozzle.

In Example 18, the subject matter of Example 17 can optionally include increasing the flow rate of water until the first emission level is equal to or less than the predetermined emissions level.

In Example 19, the subject matter of Example 17 can optionally include where in response to the first emission level being less than the predetermined emissions level, reduce the flow rate of water being injected into the gas turbine.

In Example 20, the subject matter of Example 17 can optionally include where secondary emissions control apparatus is at least one of a selective catalyst reduction apparatus and a selective non-catalytic reduction apparatus.

Example 21 can include, or can optionally be combined with any portion or combination or any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
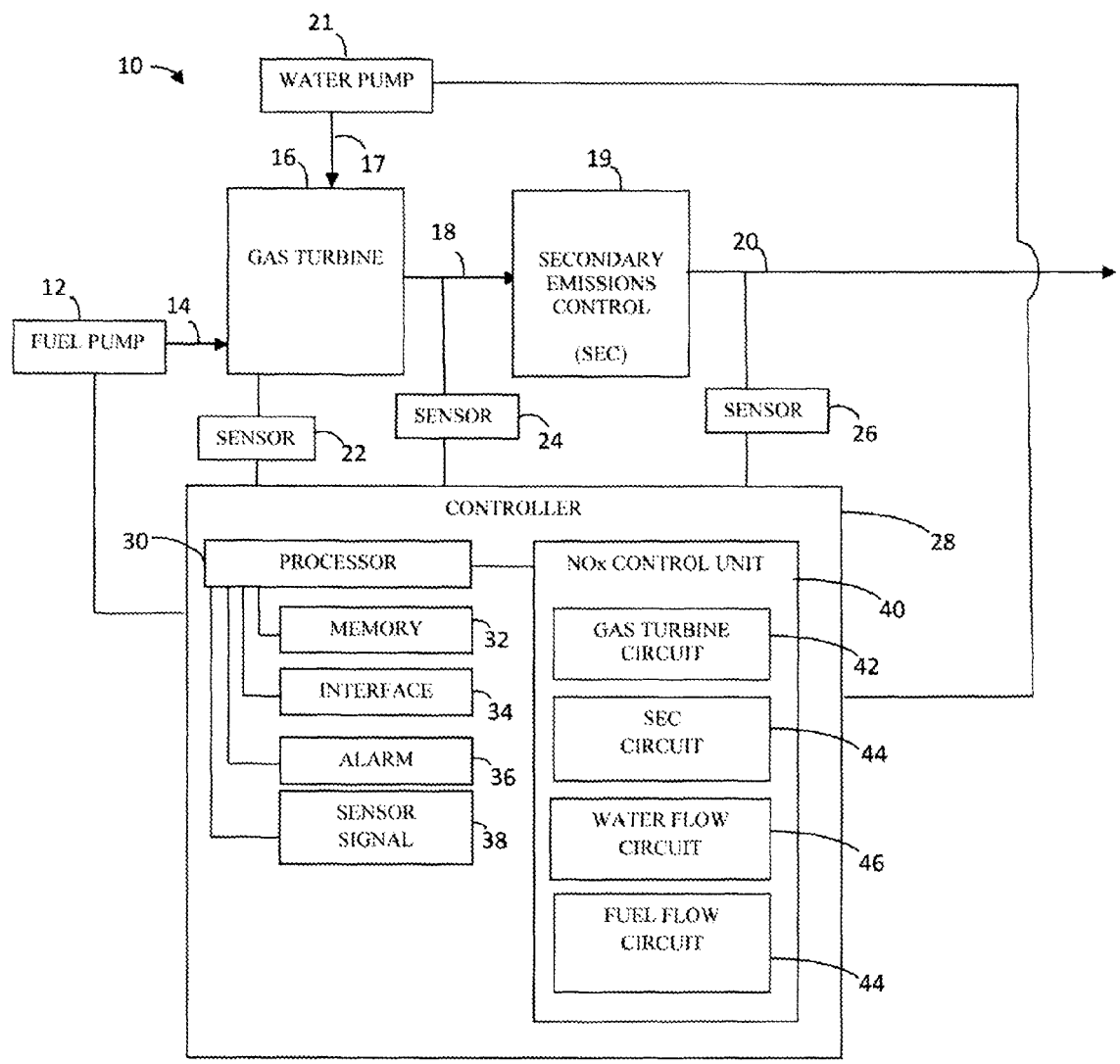
FIG. 1 illustrates an example of a block diagram of a system for emissions control of a gas turbine, according to one example of the present disclosure.

As discussed herein, previous methods for the control of NOx can include obtaining a consistent concentration level by regulating the water injected into a gas turbine. The added water can cool the flame temperature and reduce the amount of NOx emissions. In the previous approaches, the flow rate of water is determined based on the current fuel flow rate and generally provided a constant fuel to water ratio to control the NOx reductions. The amount of water to add was based on predictions models that indicated the resulting emissions from a gas turbine at various fuels to water ratios. However, the water flow rates and the fuel to water ratios generally include an amount of water that can damage the gas turbine.

The present methods and systems include a dual emissions control process including water-injection and a secondary emissions control process downstream of the gas turbine. Water to fuel injection ratios are established based on a maximum NOx input capability of the secondary emissions control process. That is, water to fuel injection ratios are minimized such that the output of the dual emissions control process meets a targeted emissions level, such as established by local or federal regulations. The allowable emissions level of the gas turbine effluent is increased because the effluent undergoes a secondary emissions reduction process. As such, the amount of water injected into the gas turbine can be reduced.

The present disclosure can provide systems and methods that can minimize the amount of water used in emission reductions and thereby extends the life of the gas turbine components. The methods and systems disclosed herein can incorporate the use of NOx prediction models embedded into the emission control unit. This embedded model can be adjusted with the use of a fast acting sensor (e.g., NOx sensor) located in the exhaust stream of the gas turbine such that when the water flow can be adjusted such that the exhaust stream of the gas turbine is operating substantially equal to the maximum NOx input capability of the secondary emissions control process. With that, the methods and systems can operate with much lower water injection rates at part load, and benefit by increase the life of the gas turbine components.

Examples of the present disclosure include systems and methods for water-injection emissions control. The system for water-injection emissions control can include a nozzle configured to inject water into a gas turbine at a specified water flow rate quantity. In an example, the nozzle is part of a water delivery system configured to delivery at least one of water and steam to the gas turbine. The water delivery system can inject water into the gas turbine, such as in a combustion can where at least one of fuel and a fuel/air mixture are provided. The injection of water into the gas turbine is configured to control emissions generated by the combustion of the at least one of fuel and fuel/air mixture. In an example, the specified water flow rate is based on a predetermined emissions level, as described herein. That is, the specified water flow rate provides a minimum amount or volume of water necessary to control emissions levels of the gas turbine effluent so as to not exceed the predetermined emissions level. The specified water flow rate can be based on a specified water to fuel ratio.

A combustion product is fluidly communicated through an effluent stream of the gas turbine. The effluent stream includes an effluent (e.g., combustion product) at or below the predetermined emissions level. The predetermined emissions level includes a specified effluent emissions flow rate, such as lbs/hr. In an example, the predetermined emissions level is based on a maximum threshold capability of a secondary emissions control apparatus. The maximum threshold capability of the secondary emissions control apparatus can include the maximum flow rate of effluent entering the secondary emissions control apparatus that can be reduced by the secondary emissions control apparatus to at least a specified emissions output threshold. The specified emissions output threshold includes emissions levels regulated by local government, federal government, or other agencies.

In various examples, the specified water flow rate can be based on the emissions reduction capability of the secondary emissions control apparatus. According to the present system, the greater the emissions reduction capability of the secondary emissions control apparatus, the less the specified water quantity necessary to control emissions. That is, the specified water flow rate is less when the quantity or rate of emissions permitted in the effluent stream of the gas turbine is greater. Reducing the specified water quantity results in longer service life of the gas turbine and its associated components.

FIG. 1 illustrates an example of a block diagram of a system 10 for emissions control of a gas turbine, according to an example of the present disclosure. The system 10 can include a gas turbine 14, a fuel pump 12, a secondary emissions control 19, a water pump, and a controller 28.

As seen in FIG. 1, the gas turbine 14 includes an inlet fuel stream 14 that is introduced into the gas turbine 14 at a fuel flow rate via the fuel pump 12. The gas turbine 14 can also include an inlet water stream 17 that is introduced to the gas turbine 14 at a specified water flow rate via the water pump 21. The water pump can include a nozzle, in some examples, to inject the water into the gas turbine 14.

The system 10 can also include sensor 22 that can sense various parameters of the gas turbine 14. For example, sensor 22 can include one or more sensors that can sense the fuel flow rate, the temperature, the pressure, the water flow rate, among others.

After combustion within the gas turbine 14, the gas turbine 14 can include a gas turbine effluent stream 18 that includes emissions (e.g., NOx) at a first emissions level. The gas turbine effluent stream 18 enters the secondary emissions control apparatus positioned downstream from the gas turbine. That is, the secondary inlet stream of the secondary emissions control 19 is the gas turbine effluent stream 18. As discussed herein, a sensor 24 can be used to monitor, or calculate by modeled values, the first emission level of the gas turbine effluent stream 18.

The secondary emissions control apparatus 19 can reduce the first emission level of the gas turbine effluent stream. Thus, the secondary emissions control apparatus 19 can have a secondary outlet stream 20 that has a second emission level that is less than the first emission level. As discussed herein, the secondary emissions control apparatus 19 can have a maximum threshold capability In an example, the system 10 can adjust the water flow such that the gas turbine effluent stream 18 includes a first emissions level that is at or below the predetermined emissions level. As discussed herein, the predetermined emissions level can include specified effluent emissions flow rate, such as lbs/hr. In an example, the predetermined emissions level is based on a maximum threshold capability of a secondary emissions control apparatus 19. The maximum threshold capability of the secondary emissions control apparatus 19 can include the maximum flow rate of effluent entering the secondary emissions control apparatus 19 that can be reduced by the secondary emissions control apparatus to at least a specified emissions output threshold. The specified emissions output threshold includes emissions levels regulated by local government, federal government, or other agencies. Sensor 26 can be used to monitor or calculate the second emissions levels leaving the secondary emissions control apparatus 19.

The system 10 of the present disclosure can include a controller 28 that can be used to reduce NOx and minimize the amount of water used during the reduction, as discussed herein. The controller can include a processor 30, a memory 32, an interface 24, an alarm 36, a sensor signal 38, and a NOx control unit 40. The controller 24 can form or be part of one or more computers. As illustrated in the example, the memory 32, the interface 34, the alarm 36, the sensor signal circuit 38, and the NOx control unit 40 are in communication with the processor 30. The processor 30 be configured to execute instructions to operate, including minimizing the water used to reduce NOx emissions.

In an example, the signal sensor circuit 34 can receive a signal from the sensors 22, 24, and 26 indicating the current water flow rate provided by the water pump 21, first emissions limit in the gas turbine effluent 18, and the second emissions limit in the secondary outlet stream 20.

The memory 32 can also be used to save various data regarding thee NOx reductions. The data can be accessed later by technicians. The interface 34 can include a keyboard, a touchpad, a screen, a printer, a network interface, or other components. The alarm 36 can be signaled for various reasons. For example, if there the second emissions limit is approaching a threshold limit, the alarm 36 can sound.

The NOx control unit 40 can include the gas turbine circuit, the SEC circuit 44, a water flow circuit 46, and a fuel flow circuit. The gas turbine circuit 42 can monitor, or calculate by modeled values, the first emission level of the gas turbine effluent stream. For example, the gas turbine circuit 42 can receive a signal form sensor 24 that indicates the first emissions level. The gas turbine circuit 42 can determine if the first emission level is greater than the predetermined emissions level. If so, the gas turbine circuit 42 can communicate with the water flow circuit 44 such that the water flow circuit 44 can send a signal to the water pump 21 to increase the amount of water injected into the gas turbine 14. The water flow can be increased to the gas turbine 14 until the gas turbine circuit 42 determined that the first emission level is less than the predetermined emissions level. Once the first emissions level is equal to or less than the predetermined emissions level, determined by the gas turbine circuit 42 and the sensor 24, the water flow circuit 46 can send a signal to the water control valve or pump 21 to reduce the flow of water injected to the gas turbine 14.

As discussed herein, the predetermined emissions level is equal to or less than a maximum emissions threshold capability of the secondary emissions control apparatus. Thus, the NOx control unit 40 can adjust the flow rate such that the first emissions level is substantially equal to the predetermined emission level, such that the secondary emission control apparatus 19 is operating at a maximum. That is, the secondary emission control apparatus is receiving the emission at an amount such that the secondary emission control apparatus 19 can reduce the emission level to at or below a federal or local regulation.

In an example, the secondary emissions control apparatus includes a selective catalyst reduction (SCR) apparatus. In an example, the secondary emissions control apparatus includes a selective non-catalyst reduction (SNCR) apparatus. Emissions include, but are not limited to, nitrogen oxide emissions (NOx).

In an example, the system is configured to operate over the entire operating spectrum of the gas turbine. In another example, the water-injection emissions control system is configured to operate when the gas turbine is below a maximum threshold load capability of the gas turbine.

In an example, the present disclosure provides a method for controlling gas turbine emissions, including injecting water and a fuel into a gas turbine at a specified water to fuel ratio. The fuel includes at least one of fuel and fuel/air mixtures. In various examples, the water to fuel ratio is volumetric or mass. As described herein, water includes at least one of liquid water and steam. In an example water can include superheated states of water. In an example, the water is injected separate from the fuel, but embodiments are not so limited. The water is injected in the gas turbine, such as in a combustion can or annular type combustors.

The method can include combusting at least the fuel in the gas turbine to provide a combustion product having the predetermined emissions level. The predetermined emissions level quantity includes pounds of NOx per hour. In an example, the method can include determining a the predetermined emissions level and determining the specified water to fuel ratio that corresponds to combustion products equal to or less than the predetermined emissions level. The method can include determining the predetermined emissions level based on a maximum emissions threshold capability of a secondary emissions control apparatus, such as downstream of the gas turbine. The maximum emissions threshold capability of the secondary emissions control apparatus is the maximum rate at which the NOx of the combustion products can be provided to the secondary emissions control apparatus that permits the secondary emissions control apparatus to reduce the emissions to a specified emissions output threshold.

In an example, the lb/hr NOx can be determined using the following Equation 1:

$$GT\ NOx\ LB/HR = (((MASS\ Air/60)/0.0761)* 1.557E\text{-}7*46*GT\ Exhaust\ NOx) \quad \text{(Equation 1)}$$

Where 46 is the molecular weight of NOx in gram/mol, 0.0761=the constants, air density, in pounds per cubic feet, and 1.557E-7 is a constant. In an example of high flow, the values can be, as follows:

$$GT\ Air\ Flow\ lb/hr = 1{,}043{,}458$$

$$GT\ NOx\ ppm = 42; and$$

$$GT\ NOx\ lb/hr = 68.74$$

In an example of low flow, the values can be, as follows:

$$GT\ Air\ Flow\ lb/hr = 787{,}107$$

$$GT\ NOx\ ppm = 55.6$$

$$GT\ NOx\ lb/hr = 68.64$$

Figure 2:
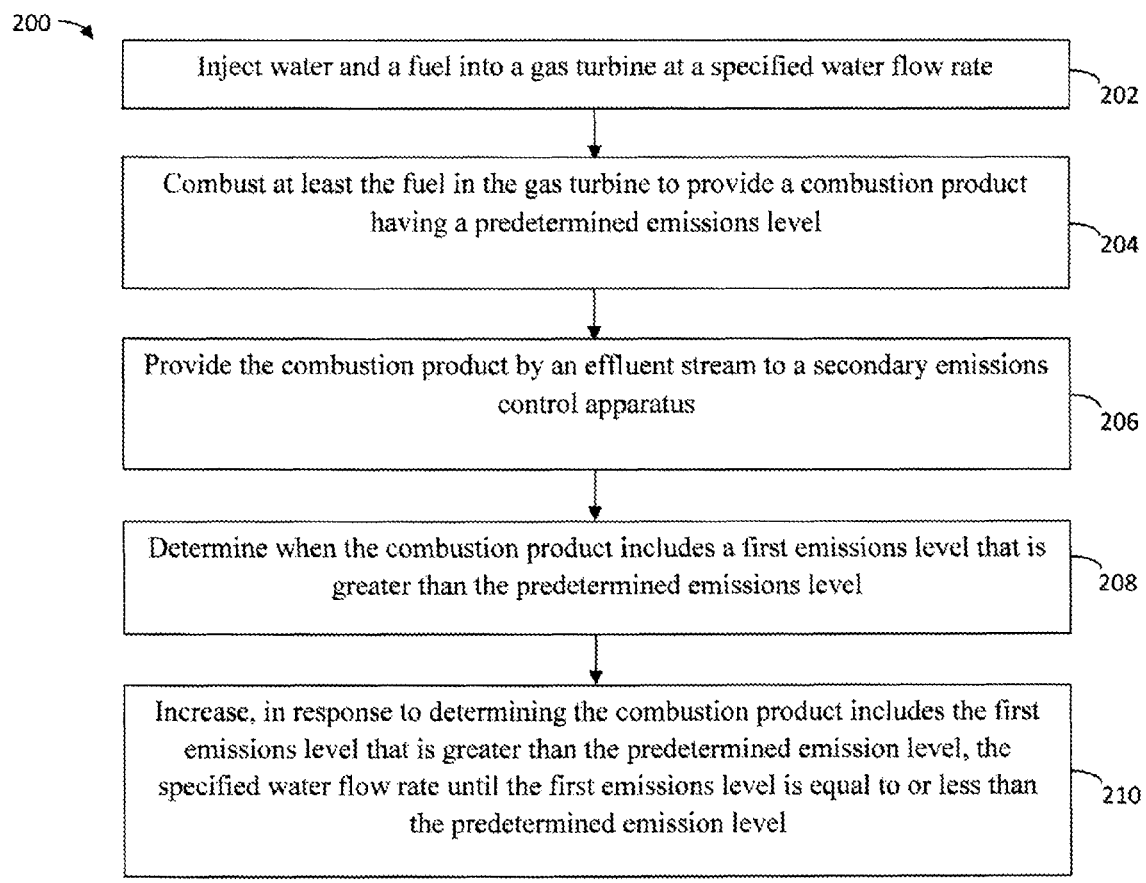
FIG. 2 illustrates a flow diagram of controlling gas turbine emissions, according to one example of the present disclosure.

FIG. 2 illustrates an example method 200 of the present disclosure. At 202, the method 200 includes water and a fuel into a gas turbine at a specified water flow rate. As 204, the method 200 includes combusting at least the fuel in the gas turbine to provide a combustion product having a predetermined emissions level. At 206, the method 200 providing the combustion product by an effluent stream to a secondary emissions control apparatus. At 208, the method 200 includes determining when the combustion product includes a first emissions level that is greater than the predetermined emissions level. At 210, the method 200 includes, in response to determining the combustion product includes the first emissions level that is greater than the predetermined emission level, increasing the specified water flow rate such until the first emissions level is equal to or less than the predetermined emission level.

In an example, the predetermined emissions level can be equal to or less than a maximum emissions threshold capability of the secondary emissions control apparatus. In an example, the specified water flow rate can be based on the predetermined emissions level. In an example, the method 200 can include determining the predetermined emission level based on a maximum emissions threshold capability of the secondary emissions control apparatus. In an example, the gas turbine is operating below a maximum load capability of the gas turbine.

ADDITIONAL NOTES

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "substantially simultaneously" or "substantially immediately" or "substantially instantaneously" refers to events occurring at approximately the same time. It is contemplated by the inventor that response times can be limited by mechanical, electrical, or chemical processes and systems. Substantially simultaneously, substantially immediately, or substantially instantaneously can include time periods 1 minute or less, 45 seconds or less, 30 seconds or less, 20 seconds or less, 15 seconds or less, 10 seconds or less, 5 seconds or less, 3 seconds or less, 2 seconds or less, 1 second or less, 0.5 seconds or less, or 0.1 seconds or less.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 20 MW to about 25 MW" should be interpreted to include not just about 20 MW to about 25 MW but also the individual values (e.g., 21 MW, 22 MW, 23 MW, and 24 MW and the sub-ranges (e.g., 21.1 MW, 21.2 MW, 21.3 MW, and the like) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described herein, the steps can be carried out in any order without departing from the principles of the inventive subject matter, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for emissions control of a gas turbine, comprising:
    a nozzle configured to inject water into a gas turbine at a first specified water flow rate;
    a gas turbine having an inlet water stream, an inlet fuel stream, and a gas turbine effluent stream, the gas turbine effluent stream including emissions at a first emission level;
    a secondary emissions control apparatus positioned downstream from the gas turbine, the second emission control apparatus having a secondary inlet stream including the gas turbine effluent stream and a secondary outlet stream, the secondary outlet stream having a second emissions level; and
    an emissions control unit, configured to:
        monitor, or calculate by modeled values, the first emission level of the gas turbine effluent stream;

determine, if the first emission level is greater than a predetermined emissions level; and increase, in response to the first emission level being greater than the predetermined emissions level, the first specified water flow rate to a second specified water flow rate.

2. The system of claim 1, wherein the predetermined emissions level is equal to or less than a maximum emissions threshold capability of the secondary emissions control apparatus.

3. The system of claim 1, further including, while the water is being injected into the gas turbine at the second specified water flow rate, the emissions control unit is further configured to:

determine, if the first emission level is less than the predetermined emissions level; and decrease, in response to the first emissions level being less than the predetermine emission level, the second specified water flow rate to a third water flow rate.

4. The system of claim 1, wherein the specified water rate is based on the predetermined emissions level.

5. The system of claim 1, wherein the specified water rate corresponds to a water to fuel ratio.

6. The system of claim 1, wherein the gas turbine is operating below a maximum load capability of the gas turbine.

7. The system of claim 1, wherein the secondary emissions control apparatus is a selective catalyst reduction apparatus.

8. The system of claim 1, wherein the secondary emissions control apparatus is a selective non-catalytic reduction apparatus.

9. A method for controlling gas turbine emissions, comprising:

injecting water and a fuel into a gas turbine at a specified water flow rate;

combusting at least the fuel in the gas turbine to provide a combustion product having a predetermined emissions level;

providing the combustion product by an effluent stream to a secondary emissions control apparatus;

determining when the combustion product includes a first emissions level that is greater than the predetermined emissions level; and in response to determining the combustion product includes the first emissions level that is greater than the predetermined emission level, increasing the specified water flow rate until the first emissions level is equal to or less than the predetermined emission level.

10. The method of claim 9, wherein the predetermined emissions level is equal to or less than a maximum emissions threshold capability of the secondary emissions control apparatus.

11. The method of claim 9, including determining the specified water rate based on the predetermined emissions level.

12. The method of claim 9, including determining the predetermined emission level based on a maximum emissions threshold capability of the secondary emissions control apparatus.

13. The method of claim 9, including operating the gas turbine below a maximum load capability of the gas turbine.

14. The method of claim 9, wherein the secondary emissions control apparatus is a selective catalyst reduction apparatus.

15. The method of claim 9, wherein the secondary emissions control apparatus is a selective non-catalytic reduction apparatus.

16. The method of claim 9, wherein the secondary emissions control apparatus includes a secondary effluent stream including a second emissions level, and wherein, when the first emissions level is at the predetermined emissions level, the second emissions level is substantially equal to a maximum emissions threshold capability.

17. A system for emissions control of a gas turbine, comprising:

a nozzle configured to inject water into a gas turbine;

a gas turbine having an inlet water stream, an inlet fuel stream, and a gas turbine effluent stream, the gas turbine effluent stream including emissions at a first emission level;

a secondary emissions control apparatus positioned downstream from the gas turbine, the second emission control apparatus having a secondary inlet stream including the gas turbine effluent stream and a secondary outlet stream, the secondary outlet stream having a second emissions level;

a water flow rate adjuster;

a first emissions sensor coupled to the gas turbine effluent stream;

an emissions control unit configured to:

determine the first emission level of the gas turbine effluent stream;

determine, if the first emission level is greater than a predetermined emissions level, the predetermined emissions level is within a predetermined range from a maximum emissions threshold capability of the secondary emission control apparatus; and increase, in response to the first emission level being greater than the predetermined emissions level, a flow rate of water introduced into the gas turbine via the nozzle.

18. The system of claim 17, further including the emission control unit is further configured to increase the flow rate of water until the first emission level is equal to or less than the predetermined emissions level.

19. The system of claim 18, further including, the emission control unit is further configured to, in response to the first emission level being less than the predetermined emissions level, reduce the flow rate of water being injected into the gas turbine.

20. The system of claim 18, wherein the secondary emissions control apparatus is at least one of a selective catalyst reduction apparatus and a selective non-catalytic reduction apparatus.

* * * * *